US012663809B2

(12) United States Patent
Magner et al.

(10) Patent No.: US 12,663,809 B2
(45) Date of Patent: Jun. 23, 2026

(54) COMPUTER SYSTEM AND METHOD FOR REAL-TIME AUTONOMOUS PATH PLANNING AND SYSTEM AND METHOD FOR PLANNING MOTION OF A ROBOTIC DEVICE AND PARTS THEREOF

(71) Applicant: MacDonald, Dettwiler and Associates Inc., Brampton (CA)

(72) Inventors: Robert Magner, Toronto (CA); Adam Philip, Toronto (CA); Robert Lucas, Brampton (CA); Bahareh Ghotbi, Toronto (CA)

(73) Assignee: MacDonald Dettwiler and Associates Inc., Brampton (CA)

( * ) Notice: Subject to any disclaimer, the term of this patent is extended or adjusted under 35 U.S.C. 154(b) by 7 days.

(21) Appl. No.: 18/799,009

(22) Filed: Aug. 9, 2024

(65) Prior Publication Data

US 2025/0060758 A1 Feb. 20, 2025

Related U.S. Application Data

(60) Provisional application No. 63/519,416, filed on Aug. 14, 2023.

(51) Int. Cl.
B25J 9/10 (2006.01)
G05D 1/633 (2024.01)

(52) U.S. Cl.
CPC .................................... G05D 1/633 (2024.01)

(58) Field of Classification Search
CPC ........... G05B 2219/40474; G05B 2219/40476; G05D 1/633; B25J 9/1664; B25J 9/1666; B25J 9/1671
See application file for complete search history.

(56) References Cited

U.S. PATENT DOCUMENTS

2020/0249654 A1* 8/2020 Edwards ................ B25J 9/1671
2021/0178590 A1* 6/2021 Mao ........................ B25J 9/1671
(Continued)

FOREIGN PATENT DOCUMENTS

CN        109807886 A      5/2019

OTHER PUBLICATIONS

Becker Marvin et al: "Circular Fields and Predictive Multi-Agents for Online Global Trajectory Planning", IEEE Robotics and Automation Letters, IEEE, vol. 6, No. 2, Feb. 24, 2021 (Feb. 24, 2021), pp. 2618-2625, XP011843825, DOI: 10.1109/LRA.2021.3061997 [retrieved on Mar. 15, 2021] * the whole document *.
(Continued)

*Primary Examiner* — Dalena Tran
(74) *Attorney, Agent, or Firm* — Own Innovation; James W. Hinton; Kent C. Howe

(57) ABSTRACT

Provided are a method, system, and non-transitory computer-readable medium for real-time autonomous path planning for a robotic device. The method includes receiving data about the robotic device in a three-dimensional workspace, encapsulating objects in the environment of the robotic device including the robotic device, a target, and one or more obstacles in simulated robotic space, calculating a direction of movement for the robotic device according to three virtual forces including a virtual attractive force, a virtual repulsive force, and a virtual tangential force acting at least partially perpendicularly relative to the virtual repulsive force, mapping each virtual force in the three-dimensional workspace into torque vectors in the simulated robotic space at each joint, converting a sum of the torque vectors into one or more commands for the robotic device defining a path to reach the target, and sending the one or more commands to the robotic device.

20 Claims, 5 Drawing Sheets

(56)                    References Cited

U.S. PATENT DOCUMENTS

2022/0072703 A1\*   3/2022   Hashiguchi ............ B25J 9/1674
2024/0025049 A1\*   1/2024   Zhu ........................ B25J 9/1697

OTHER PUBLICATIONS

Extended European Search Report issued on European Patent Application No. 24194282.0, on Dec. 10, 2024.
Hendrik Reimann et al: "Generating collision free reaching movements for redundant manipulators using dynamical systems", Intelligent Robots and Systems (IROS), 2010 IEEE/RSJ International Conference on, IEEE, Piscataway, NH, USA, Oct. 18, 2010 (Oct. 18, 2010), pp. 5372-5379, XP031812236, ISBN: 978-1-4244-6674-0 \* the whole document \*.
Rybus Tomasz Ed—Platzer Max et al: "Obstacle avoidance in space robotics: Review of major challenges and proposed solutions", Progress in Aerospace Sciences, Oxford, GB, vol. 101, Jul. 11, 2018 (Jul. 11, 2018), pp. 31-48, XP085453331, ISSN: 0376-0421, DOI: 10.1016/J.PAEROSCI.2018.07.001 \*the whole document \*.
Xiong Genliang et al: "Multiple-Point Obstacle Avoidance Based on 3D Depth Camera Skeleton Modeling and Virtual Potential Field for the Redundant Manipulator", Aug. 4, 2022 (Aug. 4, 2022), Aug. 4, 2022, pp. 35-47, XP047630098, [retrieved on Aug. 4, 2022] \* the whole document \*.

\* cited by examiner

Receiving telemetry data — 402

Encapsulating objects disposed about the robotic device — 404

Calculating a direction of movement for the robotic device — 406

Calculating a path — 408

400

502 Calculating first and second artificial potential fields

504 Determining a path the robotic device would take

506 Determining a different desirable path

500

COMPUTER SYSTEM AND METHOD FOR REAL-TIME AUTONOMOUS PATH PLANNING AND SYSTEM AND METHOD FOR PLANNING MOTION OF A ROBOTIC DEVICE AND PARTS THEREOF

TECHNICAL FIELD

The following relates generally to path planning algorithms for robotic devices, and more particularly to higher-dimensional path planning algorithms for use in dynamic environments.

INTRODUCTION

Algorithms for path planning in low-dimensional environments are used to plan a path for a robot or a part thereof, such as a robotic arm, a robotic vehicle, or a manipulator, to take or travel in the low-dimensional environments. Often an objective of such conventional algorithms is to calculate the optimal route through the low-dimensional environments, namely a route that avoids any obstacles or hazards and seeks one or more targets in an optimal fashion.

Such algorithms for path planning, particularly for optimal path planning in low-dimensional environments, require tremendous computational resources in order to calculate an optimal path and are often inefficient.

Such algorithms are adapted to low-dimensional environments where few degrees of freedom ("DoF") are available to the robot or part thereof to correct course or change movement. Given the few DoF available, optimality at the cost of efficiency characterizes such algorithms.

Such algorithms are further adapted to static environments in which obstacles or hazards to be avoided and targets to be sought do not typically move with respect to the robot or part thereof. Thus an optimal path, once calculated, is unlikely to be recalculated by such algorithms. Accordingly, such algorithms may not be able to update a calculated path in real time.

Orbital environments and outer space may present processor-constrained circumstances in which, owing to the difficulty and cost associated with launching heavy components and deploying avionics into difficult thermal and radiation environments, limited computational resources may be available to implement algorithms for path planning.

Accordingly, systems, methods, and devices for real-time autonomous path planning are desired that can efficiently compute an acceptable path.

Accordingly, there is a need for an improved system and method for real time autonomous path planning and an improved system and method for planning motion of a robotic device and parts thereof that overcomes at least some of the disadvantages of existing systems and methods.

Furthermore, such real-time autonomous path planning may take advantage of higher dimensionality (more DoF) available to the robot or part thereof to efficiently compute the acceptable path.

Moreover, such real-time autonomous path planning may occur in a dynamic environment in which obstacles and hazards to be avoided and targets to be sought can and do move with respect to the robot. Nevertheless, such real-time autonomous path planning may also occur in a static environment.

Furthermore, such real-time autonomous path planning may occur in real time in the sense that updating a planned path in response to further obstacles, hazards, and targets or unexpected movement of same occurs.

SUMMARY

A method of real-time autonomous path planning for a robotic device is provided. The method includes receiving, via a communication interface device, telemetry data about the robotic device in a three-dimensional workspace, the robotic device including a plurality of joints. The method further includes encapsulating, via one or more processors, objects in the environment of the robotic device including the robotic device, a target, and one or more obstacles in simulated robotic space, the simulated robotic space having a plurality of dimensions. The method further includes calculating, via the one or more processors, a direction of movement for the robotic device according to three virtual forces including a virtual attractive force acting to move the robotic device and the target together, a virtual repulsive force acting to move the robotic device and the one or more obstacles away from one another, and a virtual tangential force acting at least partially perpendicularly relative to the virtual repulsive force. The method further includes mapping, via the one or more processors, each virtual force in the three-dimensional workspace into torque vectors in the simulated robotic space at each joint. The method further includes converting, via the one or more processors, a sum of the torque vectors into one or more commands for the robotic device, the one or more commands defining a path to reach the target. The method further includes sending, via the communication interface device, the one or more commands to the robotic device.

The method may further include the robotic device moving along the path defined by the one or more commands to reach the target.

The one or more obstacles and the target may be dynamically moving relative to the robotic device.

The robotic device may include seven joints. The simulated robotic space may have 7 dimensions.

The robotic device may include an end effector configured to move in three translational dimensions and three rotational dimensions.

A spacecraft may be the target for the end effector and an obstacle for at least one other portion of the robotic device.

The method may be performed locally on the robotic device.

The path may be a non-optimized path sufficient for the robotic device to reach the target without interacting with the obstacles.

Mapping each virtual force in the three-dimensional workspace into the torque vectors in the seven-dimensional simulated robotic space at each joint may use the Jacobian transpose.

The mapping may occur by converting the telemetry data to the virtual forces using a potential field.

The movement of the robotic device may be continuous in real time as the path is reassessed.

Calculating each of the virtual attractive force and the virtual repulsive force may further include calculating the derivative of quadratic potentials, corresponding to artificial potential fields, acting upon the robotic device to cause the robotic device to move towards the target or away from the one or more obstacles, respectively. The artificial potential fields may not be explicitly calculated.

When the robotic device enters a local minimum in the path, the one or more commands may include a command for moving the robotic device out of the local minimum.

The method may further include approaching the target with the robotic device. The approaching may include effecting changes to angular and/or linear velocity of the robotic device to match the angular and/or linear velocity of the target, respectively.

The method may include capturing the target with the robotic device.

A system for real-time autonomous path planning for a robotic device is provided. The system includes a communication interface device for receiving or recording telemetry data about the robotic device in a three-dimensional workspace, the robotic device including a plurality of joints, and sending one or more commands to the robotic device. The system further includes a computing device comprising one or more processors and a non-transitory computer-readable medium having stored thereon computer-executable instructions that, when executed by the one or more processors, cause the following operations to be performed. The operations include encapsulating objects in the environment of the robotic device including the robotic device, a target, and one or more obstacles in simulated robotic space, the simulated robotic space having a plurality of dimensions. The operations include calculating a direction of movement for the robotic device according to three virtual forces including a virtual attractive force acting to move the robotic device and the target together, a virtual repulsive force acting to move the robotic device and the one or more obstacles away from one another, and a virtual tangential force acting at least partially perpendicularly relative to the virtual repulsive force. The operations include mapping each virtual force in the three-dimensional workspace into torque vectors in the simulated robotic space at each joint. The operations include converting a sum of the torque vectors into the one or more commands for the robotic device, the one or more commands defining a path to reach the target.

The method may further include the robotic device moving along the path defined by the one or more commands to reach the target.

The robotic device may include seven joints. The simulated robotic space may have seven dimensions. The robotic device may include an end effector configured to move in three translational dimensions and three rotational dimensions. The path may be a non-optimized path sufficient for the robotic device to reach the target without interacting with the obstacles. Calculating each of the virtual attractive force and the virtual repulsive force may further include calculating the derivative of quadratic potentials, corresponding to artificial potential fields, acting upon the robotic device to cause the robotic device to move towards the target or away from the one or more obstacles, respectively. The artificial potential fields may not be explicitly calculated.

A non-transitory computer-readable medium for real-time autonomous path planning for a robotic device is provided. The non-transitory computer-readable medium encodes instructions that, when executed by a processor, cause the processor to perform the following operations. The operations include receiving, via a communication interface device, telemetry data about the robotic device in a three-dimensional workspace, the robotic device including a plurality of joints. The operations include encapsulating, via one or more processors, objects in the environment of the robotic device including the robotic device, a target, and one or more obstacles in simulated robotic space, the simulated robotic space having a plurality of dimensions. The operations include calculating, via the one or more processors, a direction of movement for the robotic device according to three virtual forces including a virtual attractive force acting to move the robotic device and the target together, a virtual repulsive force acting to move the robotic device and the one or more obstacles away from one another, and a virtual tangential force acting at least partially perpendicularly relative to the virtual repulsive force. The operations include mapping, via the one or more processors, each virtual force in the three-dimensional workspace into torque vectors in the simulated robotic space at each joint. The operations include converting, via the one or more processors, a sum of the torque vectors into one or more commands for the robotic device, the one or more commands defining a path to reach the target. The operations include sending, via the communication interface device, the one or more commands to the robotic device.

The operations may further include the robotic device moving along the path defined by the commands to reach the target.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
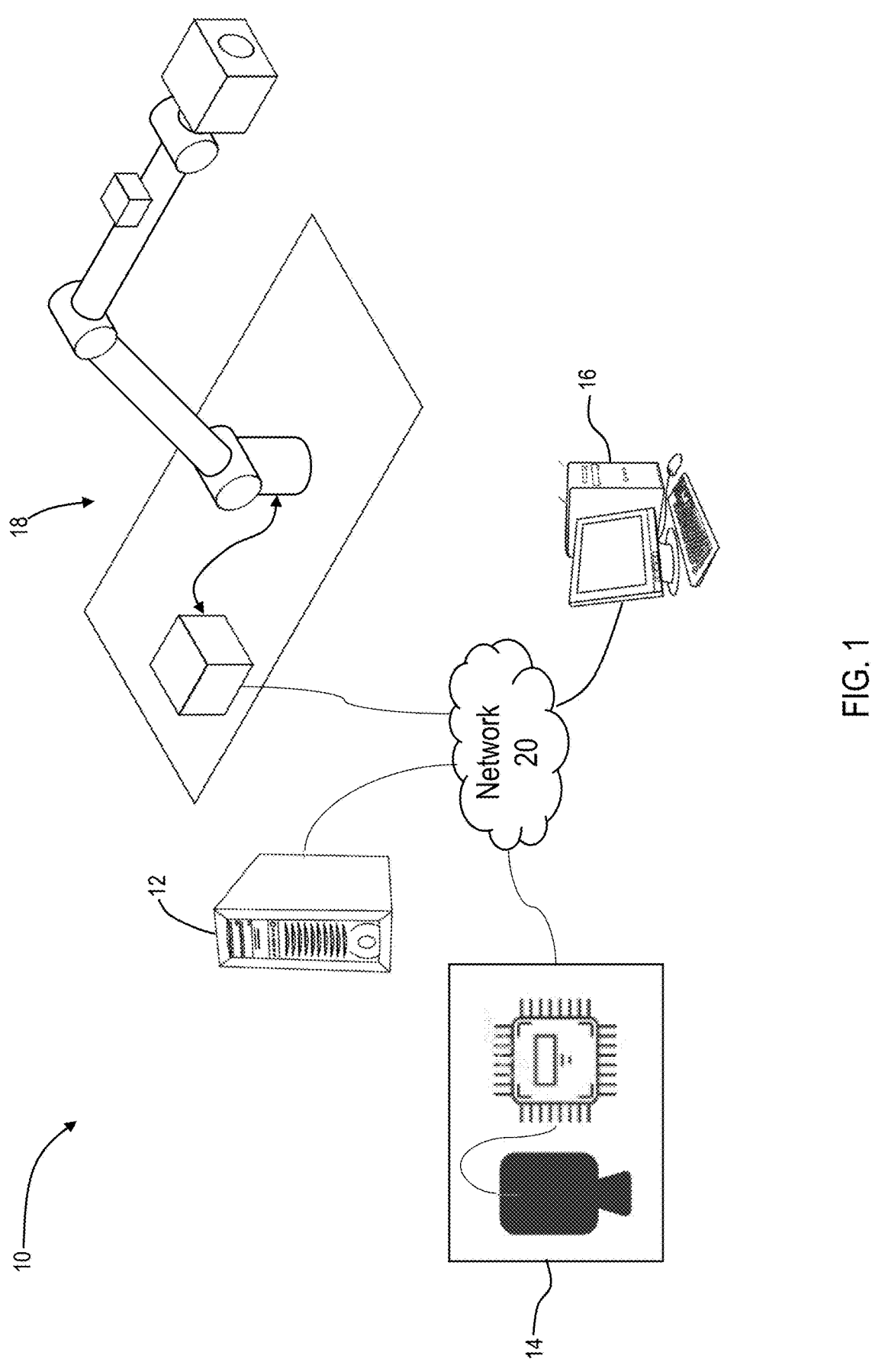
FIG. 1 is a block diagram illustrating a system for real-time autonomous path planning, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a microcontroller and embedded processors, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Although embodiments of the present disclosure are described with reference to planning paths for robots, it will be appreciated by one of skill in the art that the present disclosure has many applications. For example, the present disclosure has applications in prepared or unprepared satellite servicing, debris removal, in space assembly, and in other space robotics applications. For example, the present disclosure has applications in artificial intelligence and machine and robotic autonomy. For example, the present disclosure has applications in medicine and surgery (e.g., enabling a robot to plan its motion to dynamically avoid contacting surgeons moving within the operating room). For example, the present disclosure has applications in industry and manufacturing, such as an industrial robot that moves towards dynamic targets (e.g., randomly placed object on a conveyor belt) or an industrial robot that moves to avoid moving humans or other robots. For example, the present disclosure has application in warehousing and storage, such as multiple robots that can each pick goods off of an incoming stream (e.g., a conveyor belt). It is expressly contemplated that the present disclosure may be enhanced through implementation with artificial intelligence or machine learning.

Provided are systems, methods, and devices that implement an algorithm to plan the motion of a robotic arm in real-time in the presence of dynamic obstacles and targets. Efficient configuration space mapping allows the three-dimensional (3D) workspace in which the robotic arm, the obstacles, and the targets exist to be projected into a seven-dimensional (7D) robotic space or joint space (assuming seven robot joints) where joint trajectories are planned with low computational cost. The present disclosure is also operable for robots with fewer than seven joints using a lower-dimensional planning space (e.g., 6D planning space for six robot joints, and so on). The six-dimensional tip space of an end effector on the robotic arm (assuming a 7 DoF robotic arm) may further be calculated or represented for tracking or planning movement of the end effector. The six-dimensional tip space includes 3 translational and 3 rotational dimensions.

The foregoing spaces may be non-orthogonal and may be redundant. For example, a tip position of the end effector (represented as a first point in the six-dimensional tip space) may map mathematically to more than one point in the seven-dimensional robotic space (i.e., more than one set of joint trajectories of the joints of the robotic arm in the robotic space may result in the same tip position in the tip space). Some problems to be solved by the robotic arm may be more easily or readily solved in one space, point in a space, or configuration of the robotic arm or the end effector corresponding to a point in a space, than in other spaces, points, or configurations, respectively. In an embodiment, the algorithm advantageously transforms into a different space to solve a problem more easily and transforms back to the previous space. In an embodiment, the algorithm advantageously transforms into a different space to solve a problem more easily and remains transformed into the different space.

The tip space may correspond to or represent motion that moves the end effector somewhere within the three-dimensional workspace, e.g., a tip space motion planner to plan movement of the end effector within the workspace. Each workspace may be specific to a particular task to be performed by the robotic arm and/or the end effector. The tip space may represent Cartesian motion in any workspace more generally. The present disclosure is suitable as part of processor-limited applications. The present disclosure may be supported by one or more processor-limited applications.

In conventional path-planning algorithms, configuration space may relate to a mapping of telemetry information from the three-dimensional workspace into the seven-dimensional robotic space spanned by the joint angles. Disadvantageously in conventional path-planning algorithms, the three-dimensional workspace is explicitly mapped into corresponding blobs into a further seven-dimensional configuration space for use in planning movement of the joints and/or the robotic device. The present system and method may advantageously obviate this explicit mapping of Cartesian spatial quantities by instead computing potential forces and using a much lower cost mapping between those forces and joint space torques, decreasing computational costs and increasing computational efficiency.

Targets as described herein may further be understood as goals, for example, an object to be captured or a position in physical space to be attained. For example, the target may be a satellite, while an appendage of the satellite may be an obstacle. The target may be considered a target for an end effector of the robotic arm and further considered an obstacle for other portions of the robotic arm (e.g., the end effector seeks to grapple the target, while other portions of the robotic arm seek to avoid contact with the target and so the algorithm treats the target as an obstacle in respect of the other portions).

In an embodiment, in the case of active debris removal, provided is a robotic arm configured to capture an uncontrolled spinning spacecraft while avoiding collision with moving appendages thereof. Such a robotic arm may have further applications in space and terrestrial environments where the arm operates in the presence of dynamic environments or obstacles (e.g., environments where an arm operates with humans or other robots moving around).

Throughout the present application, a "static environment" refers to an environment where obstacles are not moving with respect to the robotic device during execution of movement of the robotic device, e.g., of a robotic arm thereof (e.g., most space station operations, where a base of the robotic device is attached to the space station and the structure of the space station is immobile with respect to the base). Throughout the present application, a "dynamic environment" refers to an environment where at least one obstacle has motion with respect to the base of the robotic device (at least one "dynamic obstacle"). Throughout the present application, a "dynamic target" means a target that has motion with respect to the base of the robotic device. Capturing an out-of-control satellite with swinging appendages is an example of a dynamic environment with a dynamic obstacle (the swinging appendages) and a dynamic target (the out-of-control satellite).

In an embodiment, the robotic arm of the present disclosure is provided in a static environment, e.g., moving the robotic arm on a space station. The robotic arm may be configured to receive plans and commands from an operations teams using software on the ground, the plans and commands being uploaded or uplinked to the arm. The robotic arm may be configured to proceed autonomously, e.g., planning and executing its own movement. The robotic arm may be configured to receive the plans and commands when provided but to proceed autonomously when such plans and commands are not provided. The robotic arm may be configured to proceed autonomously when or until a further command is provided. The robotic arm may be configured to receive the plans and commands but be permitted to modify, supplement, or ignore the plans and commands according to determinations, measurements, and/ or calculations made autonomously, internally, or locally to the robotic arm.

Because of the higher-dimensional space available for planning (e.g., seven dimensions for 7 DoF), the robotic arm of the present disclosure implementing the path-planning algorithm may advantageously plan or determine a sufficient or "good enough" path at a low computational cost. Because of the lower complexity afforded by a sparser higher-dimensional environment in which the robotic arm operates, e.g., outer space, this computational cost may advantageously be lowered sufficiently so that the robotic arm, deployed remotely (e.g., in space), is able to autonomously plan its path in an efficient manner. Specifically, the robotic arm may proceed without carrying large or expensive hardware that would otherwise be required to implement more complex conventional path-planning algorithms that seek an optimal path in a high-complexity, lower-dimensional environment. The algorithm of the present disclosure proceeds according to an efficient mapping between the three-dimensional ("3D") workspace (e.g., space) and the seven-dimensional ("7D") robotic space. The mapping advantageously needs only the Jacobian transpose, which involves relatively very little computation at the current robot joint angles to map between forces in the workspace and torques in the robotic space, circumventing the need for an explicit robotic space map which would generally require point-by-point sampling of many poses at each time step (likely hundred or thousands of samples per step for sufficient resolution) to see where collisions occur in terms of joint angles.

The path planned may be understood as a direction of motion rather than a specific path or course to take.

The path planning algorithm and associated systems, methods, and devices of the present disclosure provide a lightweight, sufficient but non-optimal approach for finding paths in real-time (i.e., configured to adapt to changes in environment on every cycle), for high-DoF robots, such as with 7 DoF. Such real-time capability may provide further advantages where a human operator would not be able to provide real-time reactions to the changing environment, e.g., due to communications delays. Accordingly, provided herein are systems, methods, and devices for providing a high-DoF configuration space mapping for low-cost real-time planning.

In an embodiment, the robotic arm is mounted to a moving robotic structure (e.g., a spacecraft in motion), and the target is also moving. Because computations according to the algorithm of the present disclosure are dynamic and performed in real-time, every time step of the algorithm includes reassessing the position of the robotic arm (and possibly the entire moving robotic structure) relative to the environment about the robotic arm and the target and plan motion for the next time step. Each time step may be approximately 0.01 seconds in duration. Each time step may be of equal length.

Calculation of the planned path may be simple or basic. Such calculation includes calculating an artificial potential field or constructing same around the robotic arm in a simulation, e.g., in robotic space. Such calculation further includes calculating the derivative of a quadratic potential as an attractive force that drives, impels, or otherwise acts upon the robotic arm to cause the robotic arm to move towards the target in the absence of a change in course, direction, speed, etc. Such calculation further includes calculating the derivative of a quadratic potential as a repulsive force that repels or otherwise acts upon the robotic arm to cause the robotic arm to move away from an obstacle or hazard in the absence of a change in course, direction, speed, etc. The attractive and repulsive forces represent gradients (i.e., derivatives) of potential fields. Advantageously, the corresponding fields are not themselves explicitly calculated. Advantageously, the algorithm effectively calculates the virtual forces associated with the potential fields. Such calculation further includes calculating forces that drive, impel, or otherwise act upon the robotic arm to cause the robotic arm to move away from or be repelled by the target in the absence of a change in course, direction, speed, etc. Such calculation further includes calculating third tangent forces that drive, impel, or otherwise act upon the robotic arm to cause the robotic arm to move in a direction at least partially perpendicular to the target, i.e., those tangent forces whose projection upon an axis perpendicular to an axis defining a shortest straight-line path between the robotic arm and the target is non-zero. Such tangent forces may include forces that drive, impel, or otherwise act upon the robotic arm to cause the robotic arm to move towards the target or away from the target with respect to a first direction of motion but away from or towards the target, respectively, in a second direction of motion perpendicular to the first direction of motion. The combined effect of each of the attractive force, the repulsive force, and the tangential forces is calculated at each step of the algorithm in order to determine the current course, direction, speed, etc. of the robotic arm in the absence of a commanded or determined change thereto. Such calculation may be understood as summing the vectors associated with each of the attractive force, the repulsive force, and the tangential forces. Where the attractive and repulsive forces are equal in magnitude and direction, only the tangential forces will effectively act on the object.

Throughout the present disclosure, it will be understood that reference to a single attractive force, repulsive force, and tangential force encompasses embodiments where there are multiple of any one or more of the virtual attractive force, the virtual repulsive force, and the virtual tangential force. The virtual forces are artificially imposed on the robot through the algorithm to generate a motion command. The tangential force applies tangentially relative to the repulsive force to avoid local minima. The net virtual force (i.e., the net of the virtual attractive force(s), the virtual repulsive force(s), and the virtual tangential force(s)) acts as a guidance for the robotic arm. The virtual forces are used to produce a reference trajectory for the arm to follow. The reference trajectory is provided to a controller of the robotic arm that instructs actuators thereon (e.g., at or controlling the joints of the robotic arm) to actuate the arm (e.g., joints thereof) to make the arm move onto or along the desired path.

The algorithm according to the present disclosure and systems, method, and devices implementing the algorithm may advantageously prevent the algorithm or the robotic device itself being "trapped" in local minima. If the planned path would have the robotic arm move down a dead end, the algorithm may provide for continued motion of the robotic arm so as to move out of the dead end and continue to wander towards the target. For example, the algorithm may configured to consider the robotic device moving tangentially to an obstacle in order to avoid the obstacle. Local minima occur when attraction to the target is equal and opposite repulsion from obstacles (i.e., when the net virtual attractive force and the net virtual repulsive force are equal in both magnitude and direction), e.g., the target is straight ahead such that the virtual attractive force would pull the robotic arm forward, but an obstacle is disposed between the robotic arm (e.g., the end effector thereof) and the target such that the virtual repulsive force would push the robotic arm straight backward. Disadvantageously, without the benefit of the algorithm according to the present disclosure, the robotic arm in such a situation would become stuck between the net virtual attractive force and the net virtual repulsive force. Advantageously, the net tangential force provides for movement at least partially tangential to the net virtual attractive force and the net virtual repulsive force. Such at least partially tangential movement may enable the robotic arm (or at least some portions thereof) to circumnavigate the obstacle so as to find an unblocked path towards the target (e.g., a path with no further obstacles disposed between the robotic arm and the target). Accordingly, the algorithm is configured to anticipate global guidance at a higher level.

As the robotic device successfully approaches the target, the robotic device may effect changes to its angular and/or linear velocity in order to match the angular and/or linear velocity of the target. As the robotic device successfully approaches the target, the robotic arm of the robotic device may effect capture of the target.

Referring now to FIG. 1, shown therein is a block diagram illustrating a system 10 for real-time autonomous path planning, in accordance with an embodiment. The system 10 includes a server platform 12 which communicates with a plurality of sensing devices 14, a plurality of command devices 16, and a plurality of robotic devices 18 (generically referred to as the robotic device 18) via a network 20. The server platform 12 may be a purpose-built machine designed specifically for processing and providing real-time autonomous path planning.

The server platform 12 receives telemetry data from the sensing devices 14. The server platform 12 may further receive telemetry data from the robotic device 18. Such telemetry data may represent position, velocity, acceleration, jerk, and other kinematic or physical properties of the robotic device 18, the target, and/or the obstacles at a point in time (e.g., camera telemetry may be used to track a moving target, and camera and/or lidar telemetry may be used to track moving obstacles).] Such telemetry data may be measured and/or calculated by the robotic device 18 independently of any data sensed by the sensing devices 14. Such telemetry data may be measured or calculated by the sensing devices 14 independently of any measurements or calculations by the robotic device 18. Such telemetry data may be measured and calculated, at least in part, through cooperation by the sensing devices 14 and the robotic device 18. Some or all of the telemetry data may be calculated by the server platform 12 based on measurements and/or calculations provided by the sensing devices 14 and the robotic device 18, whether or not cooperating together. Some or all of the telemetry data may be provided based on mathematical models of the evolution of the system 10. Some or all of the telemetry data may be provided to a state estimator to improve performance of the system 10.

The sensing devices 14 may be any one or more of cameras, imaging devices, infrared sensors, lidar devices, and accelerometers. The sensing devices 14 may include mathematical models.

The command devices 16 are configured to receive input from a human user or operator with respect to the robotic device 18. The command devices 16 are further configured to provide output to the robotic device 18. The command devices 16 may be further configured to facilitate communication between the human user or operator and the robotic device 18, such as by receiving input from the robotic device 18 and providing output to the human user or operator. The command devices 16 may be configured to receive input and/or provide output from and/or to other computers, servers, or devices, for example a series of computers intermediating and facilitating communication between the server platform 12 and the command devices 16. The output may include an identification of a particular target to be captured or engaged by the robotic device 18 (not shown) (e.g., an asset to be captured, such as a piece of debris to be captured or a satellite for the robotic device 18 to connect with) or an identification of an obstacle to be avoided (e.g., debris). The output may include a command to seek the particular target or avoid the particular obstacle. The command devices 16 may further be used to analyze the health or performance of the robotic device 18, e.g., instructing the robotic device 18 to capture telemetry so that the health or performance may be analyzed.

In an embodiment, the robotic device 18 is a robotic arm. The robotic arm is part of a mechanical or robotic structure or spacecraft. The robotic arm may have a large or sufficient number of mechanical joints in order to provide many DoF along which to actuate or move the robotic arm. The robotic device 18 may be a robotic manipulator. The manipulator may be on a moving base.

In an embodiment, the robotic device 18 is a robot. The robot may be entirely separate from any other mechanical or robotic structures or spacecraft, i.e., not a part of another component. The robot may have a large number of mechanical joints in order to provide many DoF along which to actuate or move the robot.

In an embodiment, the number of DoF is greater than 2. In an embodiment, the number of DoF is 3. In an embodiment, the number of DoF is greater than 3. In an embodiment, the number of DoF is 4. In an embodiment, the number of DoF is greater than 4. In an embodiment, the number of DoF is 5. In an embodiment, the number of DoF is greater than 5. In an embodiment, the number of DoF is 6. In an embodiment, the number of DoF is greater than 6. In an embodiment, the number of DoF is 7. In an embodiment, the number of DoF is greater than 7.

The server platform 12, sensing devices 14, command devices 16, and robotic devices 18 may be a server computer, desktop computer, notebook computer, tablet, PDA, smartphone, or another computing device. The server platform and devices 12, 14, 16, 18 may include a connection with the network 20 such as a wired or wireless connection to the Internet. In some cases, the network 20 may include other types of computer or telecommunication networks. The server platform and devices 12, 14, 16, 18 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer-executable instructions to perform processing for the functions described below. The secondary storage device may include a hard disk drive, floppy disk drive, CD drive, DVD drive, Blu-ray drive, or other types of non-volatile data storage. The processor may execute applications, computer-readable instructions or programs. The applications, computer-readable instructions or programs may be stored in memory or in secondary storage or may be received from the Internet or other network 20. The input device may include any device for entering information into the server platform and device 12, 14, 16, 18. For example, the input device may be a keyboard, keypad, cursor-control device, touchscreen, camera, or microphone. The display device may include any type of device for presenting visual information. For example, the display device may be a computer monitor, a flat-screen display, a projector or a display panel. The output device may include any type of device for presenting a hard copy of information, such as a printer for example. The output device may also include other types of output devices such as speakers, for example. In some cases, the server platform and device 12, 14, 16, 18 may include multiple of any one or more of processors, applications, software modules, secondary storage devices, network connections, input devices, output devices, and display devices.

Although the server platform and devices 12, 14, 16, 18 are described with various components, one skilled in the art will appreciate that the server platform and devices 12, 14, 16, 18 may in some cases include fewer, additional or different components. In addition, although aspects of an implementation of the server platform and devices 12, 14, 16, 18 may be described as being stored in memory, one skilled in the art will appreciate that these aspects may also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the server platform and devices 12, 14, 16, 18 and/or processor to perform a particular method.

In the description that follows, devices such as the server platform 12, the sensing devices 14, the command devices 16, and the robotic devices 18 are described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, it is described below that the devices 14, 16, 18 may send information to the server platform 12. For example, a user using the command device 16 may manipulate one or more input devices (e.g. a mouse and a keyboard) to interact with a user interface displayed on a display of the command device 16, e.g., to control one or more of the robotic devices 18. Generally, the command device 16 may receive a user interface from the network 20 (e.g., in the form of a webpage). Alternatively or in addition, a user interface may be stored locally at the command device (e.g., a cache of a webpage or a mobile application).

The server platform 12 may be configured to receive a plurality of information, from each of the plurality of sensing devices 14, command devices 16, and robotic device 18. Generally, the information may comprise at least an identifier identifying the robotic device 18. For example, the information may comprise an address of the robotic device 18 on the network 20.

In response to receiving information, the server platform 12 may store the information in a storage database. The storage database may correspond with secondary storage of the server platform 12 or device 14, 16, 18. Generally, the storage database may be any suitable storage device such as a hard disk drive, a solid-state drive, a memory card, or a disk (e.g., CD, DVD, Blu-ray). Also, the storage database may be locally connected with the server platform 12. In some cases, the storage database may be located remotely from the server platform 12 and accessible to the server platform 12 across a network, for example. In some cases, the storage database may comprise one or more storage devices located at a networked cloud storage provider.

Each command device 16 may be associated with an operator account. Any suitable mechanism for associating each command device 16 with an account is expressly contemplated. In some cases, a command device 16 may be associated with an account by sending credentials (e.g. a cookie, login, password) to the server platform 12. The server platform 12 may verify the credentials (e.g., determine that the received password matches a password associated with the account). If a command device 16 is associated with an account, the server platform 12 may consider further acts by that command device 16 to be associated with that account.

It will be appreciated by one of skill in the art that not all of the components of the system 10 are necessary for real-time autonomous path planning of the robotic device 18. In an embodiment, no dedicated server 12 is present, and all processing and provision functions with respect to the real-time autonomous path planning of the robotic device 18 are performed autonomously, internally, and locally to the robotic device 18.

In an embodiment, the sensing devices 14 are internal to the robotic device 18. In an embodiment, the sensing devices 14 are internal to the command devices 16. In an embodiment, the sensing devices 14 are present on the robotic device 18, the command devices 16, and/or elsewhere as dedicated sensing devices 14.

Figure 2:
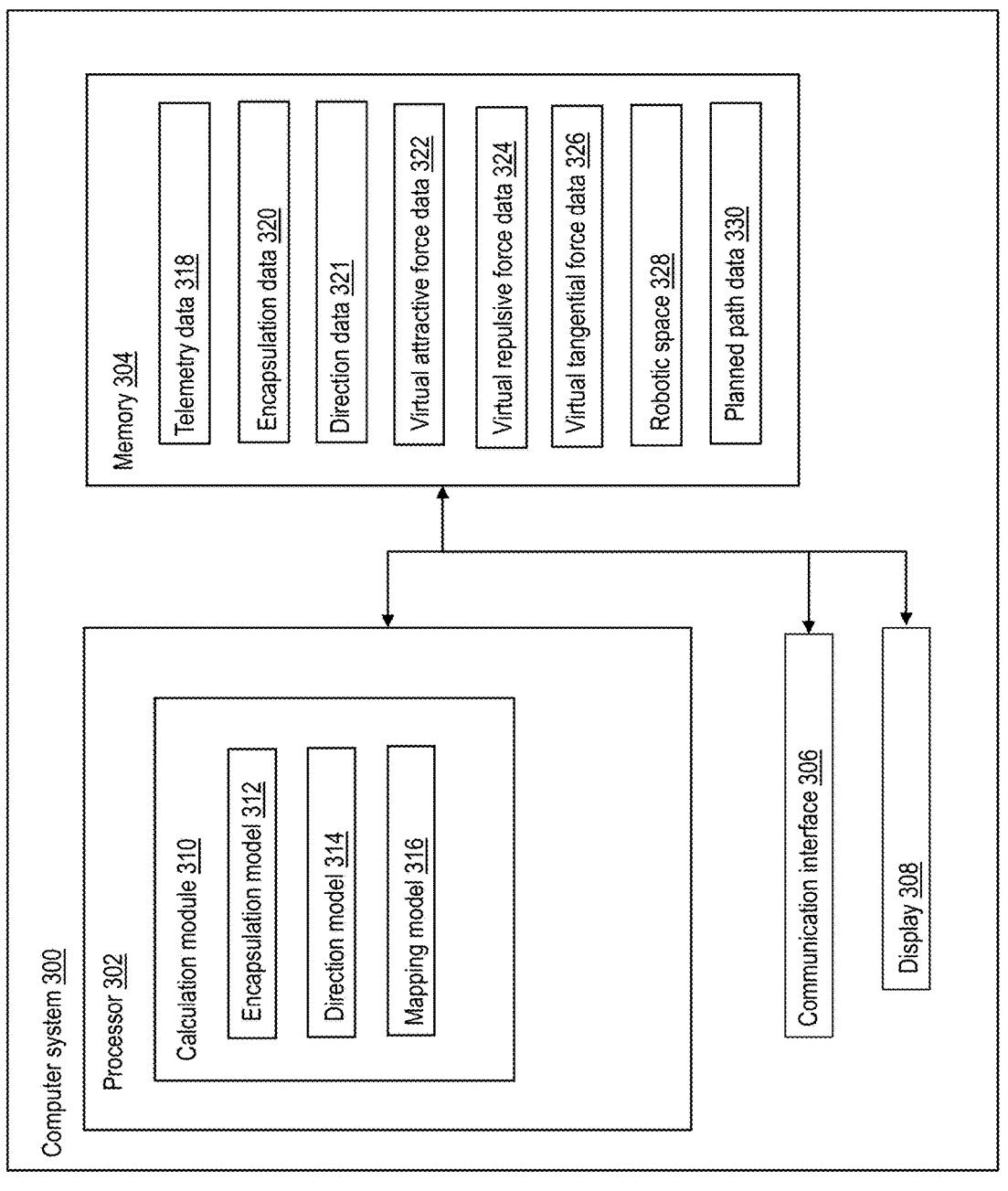
FIG. 2 is a block diagram of a computer system for autonomous path planning, according to an embodiment.

Referring now to FIG. 2, shown therein is a block diagram of a computer system 300 for autonomous path planning, according to an embodiment. The computer system 300 may be implemented at one or more devices of the system 10 of FIG. 1. For example, some or all of the components of the computer system 300 may be implemented by any one or more of the server platform 12, the command devices 16, and the robotic device 18.

The system 300 includes a processor 302 for executing software models and modules.

The system 300 further includes a memory 304 for storing data, including output data from the processor 302.

The system 300 further includes a communication interface 306 for communicating with other devices, such as through receiving and sending data via a network connection (e.g., the network 20 of FIG. 1).

The system 300 may include a vision system (not shown) for tracking a target or goal. The vision system may include a camera or imaging device for acquiring image data. The image data may be stored in memory 304. The vision system may further include one or more software components executable by the processor 302 to process the collected image data and perform target or goal tracking operations. In some cases, one or more components of the vision system may be external to system 300 and communicate with system 300 via communication interface 306 (e.g., system 300 may communicate imaging instructions to camera and receive image data from camera via communication interface 306).

The system 300 further includes a display 308 for displaying various data generated by the computer system 300 in human-readable format. For example, the display may be configured to display telemetry data 318 captured with respect to the robotic device 18. For example, the display may be configured to display a planned path produced as output by the memory 304.

The processor 302 includes a calculation module 310. The calculation module 310 receives the telemetry data 318, for example from the plurality of sensing devices 14 of the system 10 of FIG. 1.

The calculation module 310 includes an encapsulation module 312 for encapsulating objects (not shown) disposed about the robotic device 18 or sensed by the plurality of sensing devices 14 as encapsulation data 320. The encapsulation data 320 is stored in the memory 304. The encapsulation data 320 includes an encapsulation of the robotic device 18. The objects may include one or more obstacles or hazards present in the environment and that are to be avoided. The objects may include one or more targets or assets to be captured or otherwise engaged.

Encapsulation may be understood as recording or simulating the objects and the robotic device 18 in robotic space 328 stored in the memory. The robotic space 328 is an internal representation of the area about the robotic device 18, including the area the robotic device 18 occupies, and/or further area(s) sensed by the plurality of sensing devices 14. The robotic space 328 is multi-dimensional for representing each of the DoF of the robotic device 18. For example, in an embodiment where the robotic device 18 has seven DoF, the robotic space 328 is 7-dimensional. In an embodiment, the robotic space 328 has a number of dimensions equal to the number of DoF of the robotic device 18. Where one or more joints of the robotic device 18 are locked (e.g., no movement thereof is desired or all desired movement thereof has already been effected), the robotic space 328 is reduced in dimensions correspondingly, e.g., where a first joint of a 7-jointed robotic device 18 with 7 DoF is locked, the robotic space 328 may be reduced to 6 dimensions while the first joint is locked. Where additional DoF are provided to the robotic device 18 to be included in path planning (e.g., affixing an additional joint, affixing a translational mechanism at the end effector), the robotic space is augmented in dimensions correspondingly, e.g., where a translational mechanism is affixed at the end effector of a 7-jointed robotic device with 7 DoF, the robotic space 328 may be augmented to 8 dimensions while the translational mechanism is affixed.

The calculation module 310 includes a direction module 314 for calculating a direction of movement for the robotic device 18. The direction of movement is stored as direction data 321 in the memory 304. In an embodiment, the direction data 321 includes data obtained by calculation of a direction of movement along which the robotic device 18 currently travels. Such data may be understood as representing position, direction, velocity, acceleration, jerk, etc. of the robotic device 18 if no course correction is made and/or if the robotic device 18 does not receive a command to move or actuate. In an embodiment, the direction data 321 includes data obtained by calculation of a direction of movement along which the robotic device 18 does not currently travel. Such data may be understood as representing position, direction, velocity, acceleration, jerk, etc. of the robotic device 18 if a course correction is made and/or if the robotic device 18 receives a command to move or actuate, for example along a different path.

The direction module 314 calculates the direction data 321 according to virtual attractive force data 322 calculated between the robotic device 18 and the target, virtual repulsive force data 324 calculated from the other objects (i.e., between the robotic device 18 and the other objects) as encapsulated in the encapsulation data 320, and virtual tangential force data 326 as stored in the memory 304. Each of the virtual attractive force data 322, the virtual repulsive force data 324, and the virtual tangential force data 326 are artificially imposed on the robot in the context of the algorithm for generating a motion command. The virtual attractive, repulsive, and tangential forces measured by the virtual attractive, repulsive, and tangential force data 322, 324, and 326, respectively are analogous to real forces as gradients of potential fields. The virtual force data 322, 324, 326 is computed based on locations of the target and the obstacles in the three-dimension workspace and converted to commands to issue to the joints of the robotic device (e.g., the robotic device 18). Resulting commanded motion makes the robotic device move along each potential field as though true attractive, repulsive, and tangential forces were acting. The virtual attractive force corresponds to a magnetic force drawing the tip of the end effector of the robotic device to the target. The virtual repulsive force corresponds to forces pushing the robotic device away from obstacles. A path for the robotic device is computed in the seven-dimensional robotic space 328 under the influence of these virtual forces and applied in the real-world, three-dimensional workspace, where no such forces actually exist but where the robotic device, the target, and the obstacles are present.

The calculation module 310 includes a mapping module 316 for calculating a path along which the robotic device 18 may travel to avoid the obstacles and hazards and to seek the target. The calculated path is stored as planned path data 330 in the memory 304.

Calculation of the planned path data 330 may proceed via calculating an artificial potential field as an attractive force, the potential being a derivative of a quadratic potential, that drives the robotic device 18 towards the target. Such calculation further includes calculating the derivative of a quadratic potential as a repulsive force that repels or otherwise acts upon the robotic device 18 to cause the robotic device 18 to move away from an obstacle or hazard in the absence of a change in course, direction, speed, etc. Influence of each of the attractive force, the repulsive force, and the tangential force may be incorporated in the calculation in order to determine the path the robotic device 18 would take in the absence of further movement or actuation and to determine a different desirable path, if any, as the planned path data 330. Incorporation of the attractive force, the repulsive force, and the tangential force may include summing the three forces to determine how the three forces influence the direction data 321. Summing the three forces may include representing the three forces as vectors (i.e., representing each force as having both a magnitude and a direction) and summing the vectors according to the respective magnitudes and directions.

The planned path data 330, when executed by the robotic device 18, provides a path for the robotic device 18 that avoids collisions with any obstacles or hazards in the area about the robotic device 18 and along the path. This advantage obtains when properties of the area are known, for example via the sensing devices 14 and when such obstacles do not move faster than the robotic device 18. The planned path data 330 further provides a path for the robotic device 18 to reach a target. The robotic device 18 executing the planned path data 330 may advantageously push out of any dead ends as characterized by local minima with respect to a value function of a potential path and proceed to the target. For example, where the robotic device seeks to travel directly towards the target, but an obstacle blocks the most direct route. Merely calculating and following local minima would lead to the robotic device becoming "stuck" relative to the obstacle because the most efficient path, according to local minima only, would be towards the obstacle, and every path around the obstacle would be regarded as less locally efficient.

According to the foregoing advantages, global guidance at a higher level may be provided to the robotic device 18 in capturing an uncooperative target, e.g., a satellite whose communication or navigation systems are damaged such that it cannot respond to commands or moves unpredictably. In such a situation, the robotic device 18 may approach the uncooperative target to observe its movements until a high-level software agent (not shown) instructs the robotic device 18 when to begin the capture. Once such an instruction is received, the system and method for real-time autonomous path planning and system and method for planning motion of a robotic device and parts thereof according to the present disclosure plans a path to approach the uncooperative target and prevent collision between the robotic device 18 and the uncooperative target or parts thereof (e.g., solar panels of the uncooperative target not intended to be grappled by the end effector of the robotic device 18).

Although the foregoing embodiment is performed by the computer system 300 in an automated fashion, human oversight may still be incorporated, for example, via the command devices 16.

The foregoing determination of the different path according to the planned path data 330 may advantageously yield a path that is sufficient for the robotic device 18 to reach the target while avoiding collisions with the obstacles and the hazards. However, the path determined may be sub-optimal in order to save computational resources. In other words, the path may be considered "good enough" to reach the target and avoid collisions.

Determination of the different path and the foregoing calculations are performed to update the path of the robotic device 18 at regular time steps as the robot moves (e.g., every 0.01 seconds). From the perspective of a human observer, the incorporation of new information in the determination of the different path and/or the foregoing calculations (e.g., approximately 100 times per second) appears to be essentially continuous in real time.

In an embodiment, the system and method for real-time autonomous path planning and system and method for planning motion of a robotic device and parts thereof looks ahead to the target regardless of the distance between the robotic device and the target. Obstacles are considered in the determination of the different path and the foregoing calculations as the robotic device approaches the obstacles and the obstacles are within a predetermined distance of the robotic device.

In an embodiment, the foregoing system and method update at least 100 times per second.

In an embodiment, during each update, the system considers the current positions of the robotic device, the target, and/or the obstacles in the three-dimensional workspace (i.e., does not rely on predictions of future positions of the robotic device, the target, and/or the obstacles. In the embodiment, the foregoing system and method may account for changes in position of the robotic device, the target, and/or the obstacles during subsequent updates.

In an embodiment, the foregoing system and method further predict future positions of the robotic device, the target, and/or the obstacles.

Figure 3:
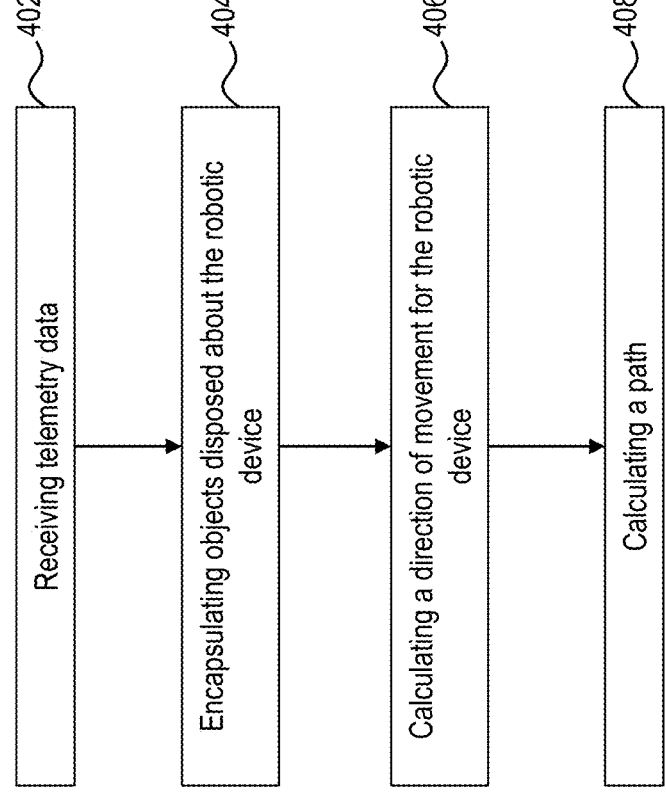
FIG. 3 is a method of autonomous path planning of a robotic device, according to an embodiment.

Referring now to FIG. 3, shown therein is a method 400 of autonomous path planning of a robotic device, according to an embodiment. The robotic device may be the robotic device 18 of the system 10 of FIG. 1. Optionally, the method 400 may include tracking a target or goal with a vision system.

At 402, the method 400 includes receiving telemetry data, for example telemetry data 318 received from the plurality of sensing devices 14 of the system 10 of FIG. 1.

Figure 5:
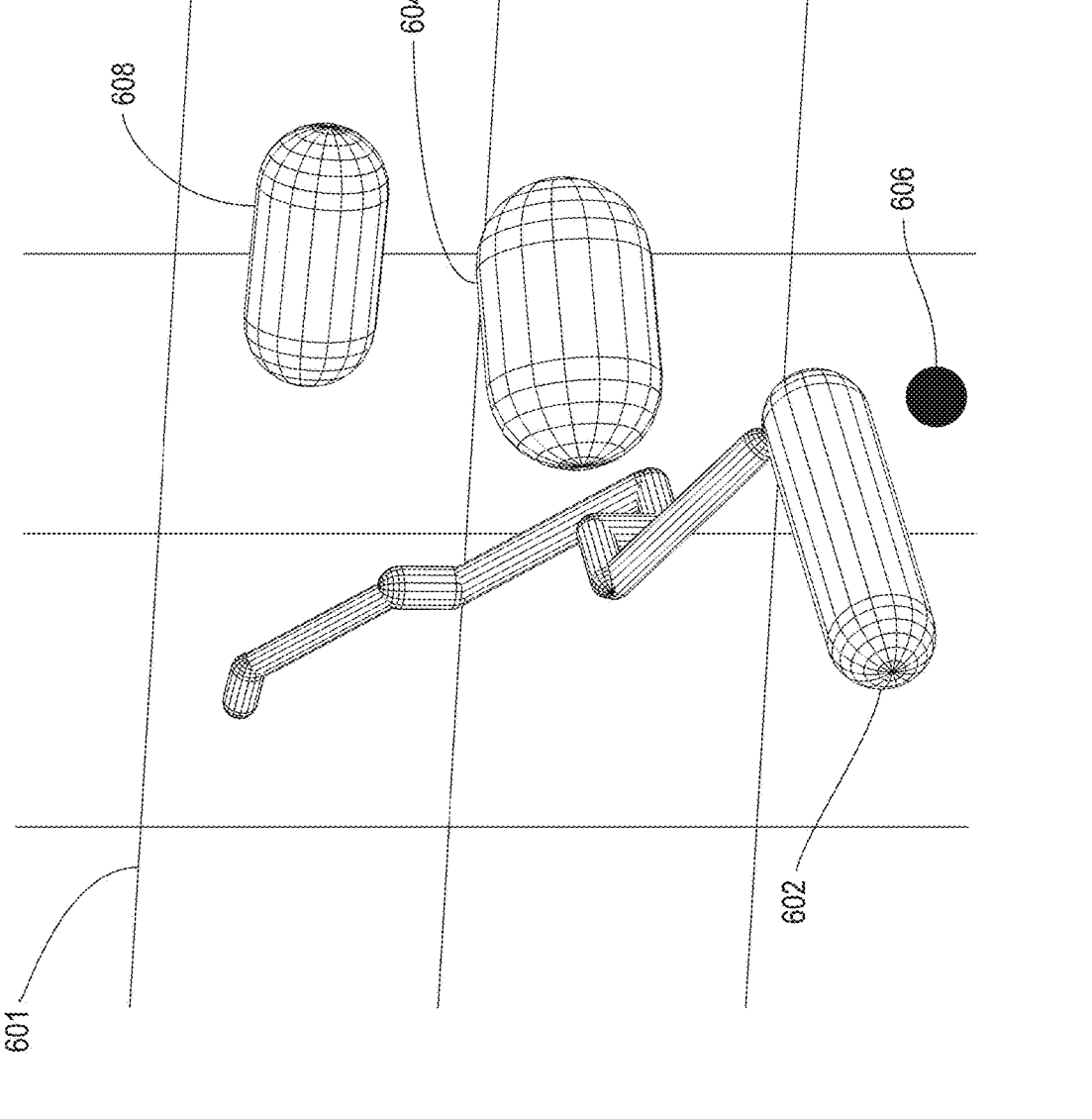
FIG. 5 is an example graphical representation of an encapsulation of objects disposed about a robotic device and of the robotic device itself, according to an embodiment.

At 404, the method 400 includes encapsulating objects disposed about the robotic device. Encapsulating the objects includes representing the objects in the robotic space 328 with perimeters, boundaries, or shells, such as shown in FIG. 5, to represent positions of the objects. It may be computationally simpler or more efficient to perform calculations in respect of the shells of FIG. 5 than real-life objects as visualized through the vision system. The objects may be considered as being in the workspace about the robotic device 18. The objects may be disposed about the robotic device 18 or sensed by the plurality of sensing devices 14. The output of encapsulating the objects may be stored as the encapsulation data 320. The encapsulation data 320 includes encapsulating the robotic device 18. The objects may include one or more obstacles or hazards to be avoided. The objects may include one or more targets to be captured or engaged by the robotic device.

As shown in FIG. 5, in an embodiment, the encapsulation data 320 includes pill-shaped capsules about the objects. The encapsulation data 320 is the result of converting a complex real shape (e.g., the robotic device 18) into one or more pill-shaped capsules to completely cover the complex real shape. The resulting encapsulation data 320 enables simplification of collision computations while ensuring that the underlying objects within the capsules do not collide because the distance between two capsules is equivalent to the distance between two lines, which is a much simpler problem to compute than determining a distance between two complex generalized shapes.

At 406, the method 400 includes calculating a direction of movement for the robotic device. The direction of movement may be stored as the direction data 321 in the memory 304. The direction data 321 may include data obtained by calculation of a direction of movement along which the robotic device 18 currently travels. Such data may be understood as representing position, direction, velocity, acceleration, jerk, etc. of the robotic device 18 if no course correction is made and/or if the robotic device 18 does not receive a command to move or actuate. The direction data 321 may include data obtained by calculation of a direction of movement along which the robotic device 18 does not currently travel. Such data may be understood as representing position, direction, velocity, acceleration, jerk, etc. of the robotic device 18 if a course correction is made and/or if the robotic device 18 receives a command to move or actuate.

The direction module 314 calculates the direction data 321 according to the attractive force data 322 of the gravitational or other attraction between the robotic device 18 and the target, the repulsive force data 324 of the repulsive force between the robotic device and the other objects as encapsulated in the encapsulation data 320, and the tangential force data 326.

At 408, the method 400 includes calculating a path along which the robotic device 18 may travel to avoid the obstacles and hazards and to seek the target by travelling under the influence of the artificial potential field and the forces induced thereby, which includes an attraction-to-goal component (i.e., the virtual attractive force), a repulsion component (i.e., the virtual repulsive force), and a component tangential to repulsion to aid in moving around obstacles and not merely away therefrom (i.e., the virtual tangential force). The calculated path may be stored as the planned path data 330 in the memory 304.

In order to move the robot, commands are issued to each joint thereof (e.g., with respect to joint rotational speed, with respect to joint angles). Telemetry information with respect to the three-dimensional workspace is stored, and mapping the three-dimensional workspace into the seven-dimensional robotic space 328 enables deriving commands for each joint based on the telemetry information. The mapping occurs by converting the telemetry data to artificial forces using a potential field, converting the artificial forces into joint-space torques, and converting the joint-space torques into commands.

Figure 4:
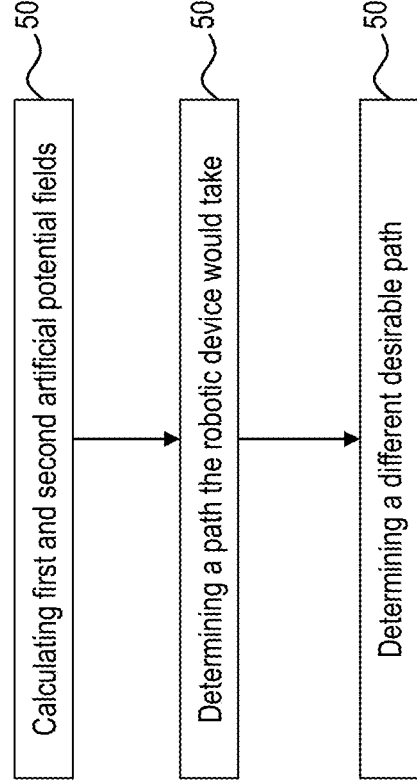
FIG. 4 is a method of calculating a path along which a robotic device travels to avoid the obstacles and hazards and to seek the target, according to an embodiment.

Referring now to FIG. 4, shown therein is a method 500 of calculating a path along which a robotic device travels to avoid obstacles and hazards and to seek a target, according to an embodiment. The method 500 corresponds to 408 of the method 400 of FIG. 3. The robotic device may be the robotic device 18 of the system 10 of FIG. 1.

At 502, the method 500 includes calculating an attraction vector corresponding to a first artificial potential field, the first potential being a derivative of a quadratic potential that drives the robotic device towards the target, and a repulsion vector corresponding to a second artificial potential field, the second potential being a derivative of a quadratic potential that drives the robotic device away from one or more obstacles.

At 504, the method 500 includes determining a current path that the robotic device would take in the absence of further movement or actuation by incorporating the influence of each of an attractive force, a repulsive force, and a tangential force in the calculation at 502.

At 506, the method 500 includes determining a desirable path different to the path determined at 504, if any, by incorporating the influence of each of the attractive force, the repulsive force, and the tangential force in the calculation at 502. The path is represented as planned path data. The planned path data may be the planned path data 330.

Incorporation of the attractive force, the repulsive force, and the tangential force at 504 or 506 may include summing the three forces to determine how the three forces influence direction data, such as the direction data 321. Summing the three forces may include representing the three forces as vectors (i.e., representing each force as having both a magnitude and a direction) and summing the vectors according to the respective magnitudes and directions.

Referring now to FIG. 5, shown therein is a graphical representation of an example encapsulation 600 of objects disposed about a robotic device and of the robotic device itself, according to an embodiment. The objects are represented graphically on a grid 601. The robotic device may be the robotic device 18 of the system 10 of FIG. 1. The encapsulation 600 may correspond to 404 of the method 400 of FIG. 3. The encapsulation 600 may be the encapsulation data 320 of the system 300 of FIG. 2.

The encapsulation 600 includes an encapsulated robotic device 602, an encapsulated obstacle 604, an encapsulated hazard 606, and an encapsulated target 608. Generally, a path for the robotic device is desired that allows the robotic device to capture or engage the target 608 while avoiding the object 604 and hazard 606.

The encapsulation 600 may advantageously permit the encapsulated robotic device 602 to actuate or move or be actuated or be moved so as to avoid the encapsulated obstacle 604 and the encapsulated hazard 606 in order to seek the encapsulated target 608.

Because the encapsulation 600 corresponds to the real-life positions of the robotic device 18, of various obstacles and hazards, and of the target to be captured or engaged, a solution to the actuation or movement of the encapsulated robotic device 602 in the encapsulation 600 corresponds to a real-life planned path that the robotic device may take to avoid the obstacles and hazards and to seek the target.

The encapsulation 600 provides for greater computer efficiency in that complex objects with multiple sides, vertices, and angles may instead be represented as capsules (e.g., the pill-shaped capsules shown in the encapsulated robotic device 602), simplifying calculations. Accordingly, any potential collision may be calculated through a finite line-to-finite line distance calculation solvable through a quadratic equation.

After identifying the closest approach between two capsules (e.g., the encapsulated robotic device 602 and the encapsulated target 608), a closest force therebetween is created and converted to a desired rate via $$\tau = J_{extended}^{T} F,$$

which combines all the forces into a torque. The torque is converted directly into a rate command for the joints to actuate accordingly.

Accordingly, execution of the foregoing calculation may advantageously always take the same amount of time to execute because iteration to solution may advantageously not be required.

Every encapsulated component of the encapsulation 600 (e.g., the encapsulated robotic device 602, the encapsulated obstacle 604, the encapsulated hazard 606, and the encapsulated target 608) mutually repulse one another.

The robotic device is governed by or receives guidance (e.g., a trajectory), according to the foregoing system and method, the guidance provided as a reference for a controller of the robotic device to execute by sending commands to actuators of the joints thereof.

While the above description provides examples of one or more apparatus, methods, or systems, it will be appreciated that other apparatus, methods, or systems may be within the scope of the claims as interpreted by one of skill in the art.

The invention claimed is:

1. A method of real-time autonomous path planning for a robotic device, the method comprising:

receiving, via a communication interface device, telemetry data about the robotic device in a three-dimensional workspace, the robotic device including a plurality of joints;

encapsulating, via one or more processors, objects in the environment of the robotic device including the robotic device, a target, and one or more obstacles in simulated robotic space, the simulated robotic space having a plurality of dimensions;

calculating, via the one or more processors, a direction of movement for the robotic device according to three types of virtual forces and moments including a virtual attractive force and moment acting to move the robotic device and the target together, a virtual repulsive force and moment acting to move the robotic device and the one or more obstacles away from one another, and a virtual tangential force and moment acting at least partially perpendicularly relative to the virtual repulsive force;

mapping, via the one or more processors, each virtual force in the three-dimensional workspace into torque vectors in the simulated robotic space at each joint, using the Jacobian transpose and without using an explicit map;

converting, via the one or more processors, a sum of the torque vectors into one or more commands for the robotic device, the one or more commands defining a path to reach the target; and sending, via the communication interface device, the one or more commands to the robotic device.

2. The method of claim 1, further comprising the robotic device moving along the path defined by the one or more commands to reach the target.

3. The method of claim 1, wherein the one or more obstacles and the target are dynamically moving relative to the robotic device.

4. The method of claim 1, wherein the robotic device includes seven joints, and wherein the simulated robotic space has 7 dimensions.

5. The method of claim 4, wherein mapping each virtual force in the three-dimensional workspace into the torque vectors in the seven-dimensional simulated robotic space at each joint uses the Jacobian transpose.

6. The method of claim 1, wherein the robotic device includes an end effector configured to move in three translational dimensions and three rotational dimensions.

7. The method of claim 6, wherein a spacecraft is the target for the end effector and an obstacle for at least one other portion of the robotic device.

8. The method of claim 1, wherein the method is performed locally on the robotic device.

9. The method of claim 1, wherein the path is a non-optimized path sufficient for the robotic device to reach the target without interacting with the obstacles.

10. The method of claim 1, wherein the mapping occurs by converting the telemetry data to the virtual forces using a potential field.

11. The method of claim 1, wherein the movement of the robotic device is continuous in real time as the path is reassessed.

12. The method of claim 1, wherein calculating each of the virtual attractive force and the virtual repulsive force further includes calculating the derivative of quadratic potentials, corresponding to artificial potential fields, acting upon the robotic device to cause the robotic device to move towards the target or away from the one or more obstacles, respectively, the artificial potential fields not being explicitly calculated.

13. The method of claim 1, wherein when the robotic device enters a local minimum in the path, the one or more commands include a command for moving the robotic device out of the local minimum.

14. The method of claim 1, further comprising approaching the target with the robotic device, the approaching including effecting changes to angular and/or linear velocity of the robotic device to match the angular and/or linear velocity of the target, respectively.

15. The method of claim 1 further comprising capturing the target with the robotic device.

16. A system for real-time autonomous path planning for a robotic device, the system comprising:

a communication interface device for receiving or recording telemetry data about the robotic device in a three-dimensional workspace, the robotic device including a plurality of joints, and sending one or more commands to the robotic device; and a computing device comprising one or more processors and a non-transitory computer-readable medium having stored thereon computer-executable instructions that, when executed by the one or more processors, cause the following operations to be performed:

encapsulating objects in the environment of the robotic device including the robotic device, a target, and one or more obstacles in simulated robotic space, the simulated robotic space having a plurality of dimensions;

calculating a direction of movement for the robotic device according to three types of virtual forces and moments including a virtual attractive force and moment acting to move the robotic device and the target together, a virtual repulsive force and moment acting to move the robotic device and the one or more obstacles away from one another, and a virtual tangential force and moment acting at least partially perpendicularly relative to the virtual repulsive force;

mapping each virtual force in the three-dimensional workspace into torque vectors in the simulated robotic space at each joint, using the Jacobian transpose and without using an explicit map; and converting a sum of the torque vectors into the one or more commands for the robotic device, the one or more commands defining a path to reach the target.

17. The system of claim 16, further comprising the robotic device moving along the path defined by the one or more commands to reach the target.

18. The system of claim 16, wherein the robotic device includes seven joints and the simulated robotic space has seven dimensions, wherein the robotic device includes an end effector configured to move in three translational dimensions and three rotational dimensions, wherein the path is a non-optimized path sufficient for the robotic device to reach the target without interacting with the obstacles, and wherein calculating each of the virtual attractive force and the virtual repulsive force further includes calculating the derivative of quadratic potentials, corresponding to artificial potential fields, acting upon the robotic device to cause the robotic device to move towards the target or away from the one or more obstacles, respectively, the artificial potential fields not being explicitly calculated.

19. A non-transitory computer-readable medium for real-time autonomous path planning for a robotic device, the non-transitory computer-readable medium encoding instructions which when executed by a processor cause the processor to perform the following operations:

receiving, via a communication interface device, telemetry data about the robotic device in a three-dimensional workspace, the robotic device including a plurality of joints;

encapsulating, via one or more processors, objects in the environment of the robotic device including the robotic device, a target, and one or more obstacles in simulated robotic space, the simulated robotic space having a plurality of dimensions;

calculating, via the one or more processors, a direction of movement for the robotic device according to three types of virtual forces and moments including a virtual attractive force and moment acting to move the robotic device and the target together, a virtual repulsive force and moment acting to move the robotic device and the one or more obstacles away from one another, and a virtual tangential force and moment acting at least partially perpendicularly relative to the virtual repulsive force;

mapping, via the one or more processors, each virtual force in the three-dimensional workspace into torque vectors in the simulated robotic space at each joint, using the Jacobian transpose and without using an explicit map;

converting, via the one or more processors, a sum of the torque vectors into one or more commands for the robotic device, the one or more commands defining a path to reach the target; and sending, via the communication interface device, the one or more commands to the robotic device.

20. The non-transitory computer-readable medium of claim 19, wherein the operations further comprise the robotic device moving along the path defined by the commands to reach the target.

* * * * *